(12) United States Patent
Wang et al.

(10) Patent No.: US 9,246,636 B2
(45) Date of Patent: Jan. 26, 2016

(54) METHOD FOR DETECTING TCP PACKET LOSSES AND EXPEDITING PACKET RETRANSMISSION

(71) Applicant: AppEx NETWORKS HOLDING LIMITED, Grand Cayman (KY)

(72) Inventors: Yongdong Wang, Cupertino, CA (US); Hao Zhuang, Sammamish, WA (US)

(73) Assignee: Appex Networks Holding Limited, Grand Cayman (KY)

( * ) Notice: Subject to any disclaimer, the term of this patent is extended or adjusted under 35 U.S.C. 154(b) by 0 days.

(21) Appl. No.: 14/326,311

(22) Filed: Jul. 8, 2014

(65) Prior Publication Data

US 2014/0317464 A1   Oct. 23, 2014

Related U.S. Application Data

(63) Continuation of application No. 12/357,304, filed on Jan. 21, 2009, now Pat. No. 8,819,512.

(60) Provisional application No. 61/022,318, filed on Jan. 19, 2008.

(51) Int. Cl.
  *G08C 25/02* (2006.01)
  *H04L 1/08* (2006.01)
  *H04L 29/06* (2006.01)
  *H04L 12/939* (2013.01)

(52) U.S. Cl.
  CPC ............... *H04L 1/08* (2013.01); *H04L 49/552* (2013.01); *H04L 69/163* (2013.01); *H04L 69/166* (2013.01)

(58) Field of Classification Search
  CPC ... H04L 1/1809; H04L 1/1812; H04L 1/1887; H04L 1/1819; H04L 1/188

USPC .......................................................... 714/748
See application file for complete search history.

(56) References Cited

U.S. PATENT DOCUMENTS

| | | | |
|---|---|---|---|
| 5,444,718 A | 8/1995 | Ejzak et al. | |
| 5,754,754 A * | 5/1998 | Dudley et al. | 714/18 |
| 6,301,249 B1 | 10/2001 | Mansfield et al. | |
| 6,392,993 B1 * | 5/2002 | Hamilton | H04L 12/1877 370/230 |
| 6,959,323 B1 * | 10/2005 | Tzeng et al. | 709/205 |
| 2002/0150048 A1 | 10/2002 | Ha et al. | |
| 2006/0221825 A1 | 10/2006 | Okano | |
| 2006/0271680 A1 * | 11/2006 | Shalev et al. | 709/225 |

(Continued)

OTHER PUBLICATIONS

Office Action dated Nov. 23, 2011, issued in corresponding U.S. Appl. No. 12/357,304, (7 pages).

(Continued)

*Primary Examiner* — Albert Decady
*Assistant Examiner* — Enam Ahmed
(74) *Attorney, Agent, or Firm* — Finnegan, Henderson, Farabow, Garrett & Dunner, LLP

(57) ABSTRACT

A computer-implemented method for detecting TCP packet losses and expediting packet retransmission is disclosed. The method includes assigning to each packet transmitted or retransmitted a sequential order number, determining from an ACK packet or SACK segment thereof the sequential order number of a received packet, recording the determined sequential order number as a highest received order number in case the determined sequential order number is greater than a current highest received order number, and retransmitting all unacknowledged packets having sequential order numbers less than the highest received order number.

10 Claims, 3 Drawing Sheets

(56) References Cited

U.S. PATENT DOCUMENTS

| | | | |
|---|---|---|---|
| 2009/0003366 A1* | 1/2009 | Chen et al. | 370/406 |
| 2009/0196294 A1* | 8/2009 | Black | H04L 1/1607 370/394 |
| 2009/0196421 A1 | 8/2009 | Okuda | |

OTHER PUBLICATIONS

Notice of Allowance dated Apr. 11, 2014, issued in corresponding U.S. Appl. No. 12/357,304, (13 pages).

* cited by examiner

METHOD FOR DETECTING TCP PACKET LOSSES AND EXPEDITING PACKET RETRANSMISSION

CROSS REFERENCE TO RELATED APPLICATIONS

This application is a continuation application of U.S. Non-Provisional patent application Ser. No. 12/357,304, filed on Jan. 21, 2009, which claims the benefit of U.S. Provisional Patent Application No. 61/022,318, filed on Jan. 19, 2008. The entire disclosures of the above-referenced applications are incorporated herein by reference.

BACKGROUND OF THE INVENTION

The present invention relates generally to processing packets in computer networks, wireless data networks, and network components of computer operating systems, and more particularly to improvements to the Transmission Control Protocol (TCP) on wired and wireless Wide Area Networks (WANs).

Internet Protocol (IP) is the most widely used protocol in today's computer and data networks. Running on top of IP, TCP has become the dominant transport protocol for applications requiring reliable packet transmission. Even for applications that do not require reliable packet transmission, such as video and voice applications, TCP has gained popularity on WANs because compared to UDP, TCP traffic is more likely to be able to pass the firewalls and other security devices widely deployed in today's networks. Detailed information about TCP and IP can be found in RFC793 and RFC791.

In addition to reliable packet transmission, TCP provides flow control that adapts to dynamic bandwidth changes in networks. Although, TCP has been scaled with the rapid expansion of the internet, it has become evident that TCP does not work well on long latency and high loss network links, especially wireless data networks. TCP is not able to use the available bandwidth efficiently in these types of networks because the assumption that packet loss is mainly due to network congestion is not always true. For transactional applications and real time applications, this inefficiency in TCP introduces unacceptable latency and throughput that does not meet the applications' needs.

To improve TCP performance in these types of networks, prior art solutions include scaling up the TCP window to deal with the so-called long fat pipe (long latency and high bandwidth network links) and redefining certain IP fields and/or TCP fields in order to better judge packet loss on the TCP sender side. Though these solutions provide improvements over standard TCP on certain networks, they all require deploying a modified TCP stack on the TCP sender and receiver sides. This requirement increases both the difficulty and cost of their deployment. In addition, the prior art solutions rely on RTO (retransmission timeout, refer to RFC793) to detect continuous packet losses and to trigger retransmissions. The resulting lagged retransmission and reduction of throughput does not meet the requirements of transactional or real time applications.

SUMMARY OF THE INVENTION

The present invention solves the problems of the prior art by providing computer-implemented methods operable to promptly detect TCP packet losses and expedite the retransmission thereof to significantly decrease the latency and increase the throughput of TCP based applications, and more particularly transitional and real time applications. The methods are deployable on one side of the TCP connection and work with existing TCP stacks. Being completely compatible with standard TCP, the methods of the invention solve the deployment difficulties faced by existing TCP improvement solutions.

In accordance with one aspect of the invention, a computer-implemented method for detecting TCP packet losses and expediting the retransmission thereof includes the steps of assigning to each packet transmitted or retransmitted a sequential order number, determining from an ACK packet or SACK segment thereof the sequential order number of a received packet, recording the determined sequential order number as a highest order number in case the determined sequential order number is greater than a current received order number, and retransmitting all unacknowledged packets having sequential order numbers less than the highest received order number.

In accordance with another aspect of the invention, a computer-implemented method for determining a difference between sequence numbers in SACK segments and sequence numbers they represent includes the steps of sending at least one probe packet following transmission of a first packet, the probe packet being a portion of a selected untransmitted packet and having a length not equal to the length of any packet with a sequence number less than that of the selected untransmitted packet, and determining the difference between a sequence number of a received SACK segment and a corresponding sequence number of the probe packet following receipt of an ACK packet having a SACK segment equal in length to a length of the probe packet.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of design and to the sequence of method steps set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and systems for carrying out the several purposes of the present invention. It is important, therefore, that the claims be regarded as including such equivalent methods and systems insofar as they do not depart from the spirit and scope of the present invention.

DETAILED DESCRIPTION OF THE INVENTION

The following detailed description is of the embodiments for carrying out the invention. The description is not to be taken in a limiting sense, but is made merely for the purpose of illustrating the general principles of the invention, since the scope of the invention is best defined by the appended claims.

Figure 1:
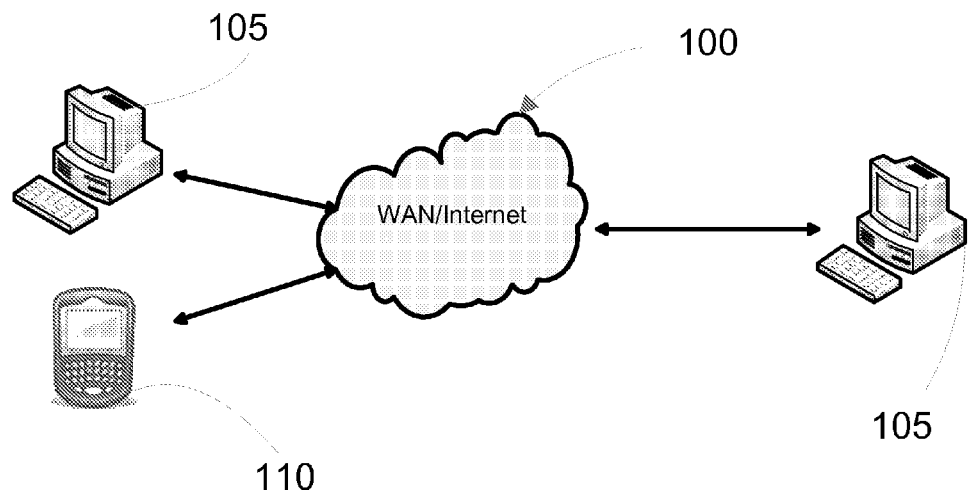
FIG. 1 illustrates a network environment in which the present invention may be practiced.
Figure 2:
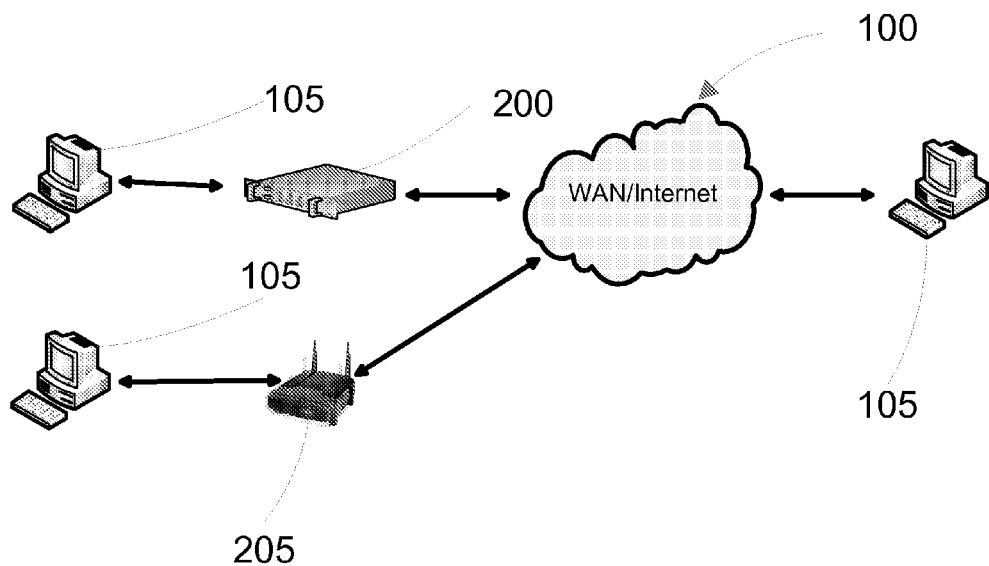
FIG. 2 illustrates another network environment in which the present invention may be practiced.

The methods in accordance with the invention can be implemented as TCP enhancements in a network host having a TCP/IP network stack in its operating system. The TCP enhancements can be implemented either as a virtual network interface or replace the standard TCP stack. The network host can be a computer 105 or a smart phone 110 in a network 100 as shown in FIG. 1. As will be appreciated by those skilled in the art, the network host can be any device with TCP/IP in its operating system including a WAN accelerator 200 and a wireless router 205 (FIG. 2).

The TCP enhancements can also be implemented in a TCP proxy in a network device. A TCP proxy is often used to improve transmission efficiency in a network. When a TCP proxy in a network device receives a TCP packet on any network interface, it looks into the IP and TCP protocol headers and makes the decision on whether or not to send the packet at once, to buffer the packet, or to drop the packet. The TCP proxy may also choose to locally respond to the TCP sender with ACK packets. The network device with the TCP proxy is most likely deployed on the edge of a Local Area Network (LAN).

The possible usage scenarios of the TCP enhancements in accordance with the invention include, but are not limited to, the above two examples. In any terminals or network devices where TCP is used as the transport protocol, the TCP enhancements can be applied to improve the transmission efficiency, reduce latency and increase effective throughput of the applications.

In today's internet, packet reordering is very rare. When a TCP packet is not received but the packets of the same TCP connection sent after it are received by the receiver, the packet is most likely lost. Based on this, the methods in accordance with the invention treat receipt of out of sequence packets as evidence of packet loss.

Before any packets are retransmitted, dup ACK (TCP Acknowledgment, refer to RFC793) or SACK (Selective Acknowledgment, refer to RFC2018) packets can be used to determine out of sequence packets. But when packets are retransmitted, it becomes difficult to determine which packets are lost relying solely on dup ACK and SACK packets. In lossy networks, retransmissions may frequently happen and hence relying solely on dup ACK and SACK packets is not efficient enough to detect packet loss. To cope with this, a computer-implemented method in accordance with the invention provides a mechanism to track the packet sending order at the TCP sending side and assign each packet an order number (referred to as order-stamp hereinafter) upon its transmission or retransmission. At the same time a current highest order number (referred to as highest-recv-order hereinafter) of each packet received by the receiver side according to the ACK and SACK information from the receiver is maintained. As highest-recv-order increases, all transmitted but unacknowledged packets with smaller order-stamp values are retransmitted.

The order-stamp value reflects the sending sequence of each packet transmitted or retransmitted and hence is more robust to use for judging reordering than the standard TCP sequence number, considering that retransmission frequent in lossy networks. When a retransmitted packet is received by the receiver side as indicated by ACK or SACK packet information, the order-stamp of the latest retransmission of the packet can be larger than those packets with higher sequence numbers, and hence can be used to detect the loss of those packets.

The key to this method is to ensure the accuracy of the highest-recv-order value. This requires that each retransmission's reception signal by the receiver side that is used to determine the highest-recv-order value really is triggered by the latest retransmission of the packet. Some retransmissions with ambiguity hence cannot be assigned with a larger order-stamp.

Both order-stamp and highest-recv-order values exist within a TCP connection context. Each TCP connection maintains a highest-recv-order value and a cur-order-stamp value. The cur-order-stamp value is initialized to a certain number, for example, 100. Each data packet has a unique order-stamp value associated with it. After the TCP three-way-handshake completes and one side of the TCP connection (referred to as the sending side) starts to transmit packets, the first packet transmitted is assigned with the initial cur-order-stamp value. Thereafter, with each succeeding packet sent out, the cur-order-stamp value is increased by one and assigned to the packet as its order-stamp value. When a packet is retransmitted, if the retransmission is triggered by reorder detection, it is considered a retransmission without ambiguity and the retransmitted packet is assigned a new order-stamp value to replace its previous order-stamp value. Except for this case, all other retransmissions are considered to have ambiguity, and no new order-stamp value is assigned to the retransmitted packet.

On the other hand, the highest-recv-order value reflects the receipt of packets on the TCP receiver side. Its initial value is equal to the value of initial cur-order-stamp minus one. With each received ACK packet, the TCP sending side analyzes the ACK and SACK segments if they exist. For each ACKed or SACKed packet, if its order-stamp value is greater than the highest-recv-order value, the highest-recv-order value is updated to be equal to this order-stamp value. When the value of highest-recv-order is increased, all transmitted packets that are not ACKed or SACKed and that have order-stamp values less than the value of highest-recv-order are determined to be lost and need to be retransmitted. The packets retransmitted under this scenario are determined to be without ambiguity as previously mentioned.

The values of cur-order-stamp and highest-recv-order may round over. Different approaches may be used to overcome this problem. For example, a 32 bit signed integer can be used as a data type for the order-stamp, cur-order-stamp and highest-recv-order. If the value of order-stamp minus highest-recv-order is greater than zero, the order-stamp value can be determined to be greater than the highest-recv-order value.

The mechanism of the invention assumes that an out-of-order received packet indicates that the packets sent before it failed to reach the receiver side. The implementation should make sure that all data packets of the same TCP connection are sent out in order. In today's Internet, most network devices schedule the packets of the same TCP connection in the same queue to guarantee the sending order. Only in rare situations, such as when dynamic route balancing is triggered on a router, does reordering in the same TCP connection happen. In most cases however, reordering is caused by packet loss.

Figure 3:
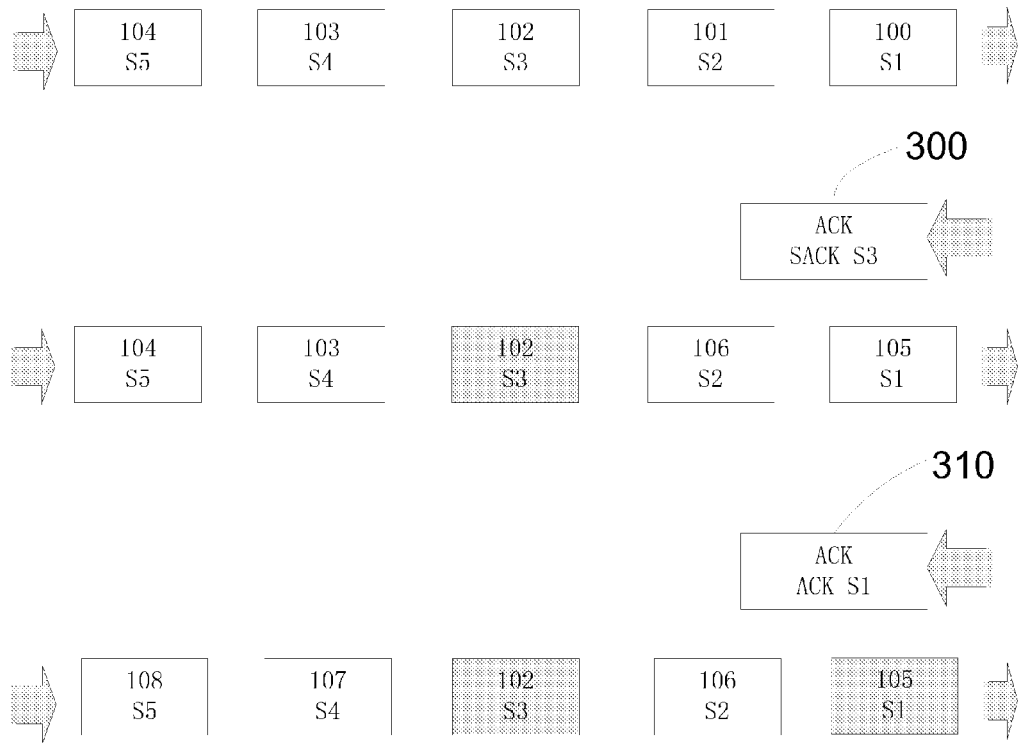
FIG. 3 illustrates packet flow in accordance with a method of one embodiment of the invention.

FIG. 3 illustrates sent packet order tracking and retransmission triggered by reordering. Initially, the TCP sending side sends out five packets with TCP payloads having sequence numbers S1 to S5 respectively. Each of the five packets is assigned an order-stamp value from 100 to 104 respectively. The highest-recv-order value is 99, which is one less than the initial cur-order-stamp value of 100. An ACK packet 300 is sent by the receiver side that does not acknowledge any new data but carries a SACK segment indicating the receiver side has received the packet with sequence S3. After ACK packet 300 is received, the highest-recv-order value is updated to 102 (the order-stamp value of packet S3) and packets S1 and S2 (both having smaller order-stamp values than 102) are retransmitted and assigned new order-stamp values 105 and 106 respectively.

An ACK packet 310 indicates the receipt of packet S1. ACK packet 310 does not contain any SACK segment. Now the highest-recv-order value is updated to 105 (the order-stamp value of S1) and packets S4 and S5 (both with smaller order-stamp values) are retransmitted and assigned new order-stamp values 107 and 108 respectively.

The described method is effective when used with applications wherein the sending side always has a large amount of continuous packets to send before getting feedback from the receiver because the sending of the new packets can be used to detect the previous packets' loss. An exemplary application is FTP (File Transfer Protocol, refer to RFC959). But for transactional applications, the sending side normally needs to wait for feedback from the receiver side before sending more packets. In this case, if the latest transmitted packet is lost, it becomes impossible to detect its loss with the above-described method because no new packet triggers a dup ACK or SACK packet and hence the highest-recv-order value does not increase. Furthermore, for real time applications, the packets may be spaced in time and the advancing of the highest-recv-order value is not prompt enough and presents a problem similar to that of transactional applications. Additionally, even for non-transactional and non-real-time applications, the sending of new packets may be limited by the congestion window or advertise window. In these situations, the above-described method cannot detect lost packets promptly enough and has to rely on RTO handling for retransmission which significantly increases delays.

In accordance with another aspect of the invention, a probing mechanism is provided to handle this problem. When there are transmitted packets not acknowledged by the receiver side and no new packets to send, a timer is set. Upon timeout of the timer, a probe packet is sent to trigger ACK or SACK information from the receiver side to detect the loss of packets. To reduce the additional traffic load, the probe packet includes only one byte and the timeout value and probe frequency are carefully chosen. To increase the possibility of triggering ACK or SACK packets that have useful information for detecting packet loss, the TCP sequence of the one-byte probe packet is carefully chosen.

To avoid injecting too much additional traffic to the network, the time interval between probing should not be too small. On the other hand, to increase the promptness, the time interval should not be too large. To reach a balance, network latency should be considered. For example, the method can use the value of SRTT (Smoothed Round Trip Time, refer to RFC793 and RFC2988) as the time interval, or use a value half of SRTT as the time interval if promptness is a main concern and slightly higher bandwidth consumption is tolerable. In case of a new transmission, i.e., either sending a new packet or retransmitting a packet, the timer is reset.

To increase the possibility of receiving helpful ACK and SACK information from the receiver side, the probe packet needs to be carefully chosen. To avoid confusing the receiver side, the one-byte probing packet needs to use the same byte value in the TCP stream so that the receiver side always has the correct data stream.

The following is the description of a preferred algorithm for TCP reorder probing. To keep the efficiency in implementation, the TCP sending side keeps track of a golden packet that the one-byte should come from. The golden packet can be located as follows:
1. The TCP sequence of the golden packet must be within the advertise window and not SACKed. Sometimes when the TCP receiver side shrinks the advertise window, the sending side may have some transmitted packets fall out of the shrunk advertise window. Also some TCP improvement proxy may choose to send beyond advertise window to allow higher throughput.
2. Choose a packet with the largest order-stamp value among all the transmitted packets that meet the above criteria.

After the golden packet is located, the criteria to pick the one-byte are:
1. Avoid using the largest TCP sequence byte of the golden packet because it may merge with the next packet in the SACK segment from the receiver side in case the receiver side already received the next packet sequencing right after the golden packet. When this happens, the TCP stack is likely to give a single SACK segment covering both the next packet and the one-byte probe packet, which adds ambiguity on receiving ordering.
2. Avoid using the second largest TCP sequence byte of the golden packet because the SACK sequencing delta probing (discussed below) uses the largest TCP sequence byte of a specific packet. If the golden packet happens to be the same packet used for the SACK sequence delta probing packet, the two probing bytes will combine in one SACK segment in the ACK packet from the receiver side, and this will add ambiguity to the probing.
3. Avoid using the first byte of the golden packet because it may merge with the previous packet in the SACK segment returned from the receiver side and add ambiguity to the probing.
4. Avoid using the second byte of the golden packet because the first byte of a packet is often used as the zero-ACK probe by the TCP stack. If the first sequence of the golden packet was used as zero-ACK probe sequence (in this case the golden packet must be the first non-ACKed packet), using the second byte for TCP reordering probing may cause the receiver side to advance the ACK to the third sequence of the packet and introduce ambiguity to the probing.
5. The sequences of one-byte probing cannot be adjacent; otherwise the returned SACK segment may combine the sequences and introduce ambiguity.
6. In case there is no new transmission or retransmission after the last one-byte probing, the next one-byte probe can use the same TCP sequence as the last TCP sequence used for probing.

Figure 4:
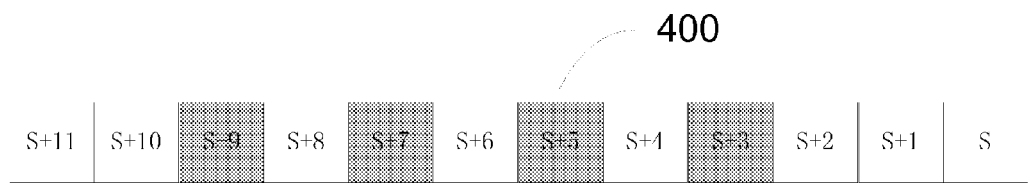
FIG. 4 illustrates packet flow in accordance with another exemplary method of the invention.

FIG. 4 shows a golden packet 400 with 12 bytes payload, starting with TCP sequence S and ending with TCP sequence S+11. Applying the above criteria, four sequences are qualified to be selected for one-byte probing. In case there are transmissions or retransmissions between four continuous TCP reorder probes with this same packet as the golden packet (when those transmissions or retransmissions are all not qualified to be golden packets), S+9, S+7, S+5, S+3 should be picked for one-byte probing respectively.

In case the golden packet TCP payload size is smaller than a certain number (eight is used for further discussion) or the golden packet runs out of TCP sequences for one-byte probing according to the one-byte sequencing selection criteria, the golden packet should be retransmitted. This retransmission is with ambiguity because it is retransmitted without being detected as being lost; hence it cannot be assigned with a new order-stamp value.

In the case where the golden packet is received by the receiver side and an ACK/SACK packet carrying this information is received by the TCP sending side, a good signal to detect reordering and determine packet loss is provided because the golden packet has a relatively large order-stamp value (the golden packet has the largest order-stamp among all transmitted packets unless the transmission exceeds the advertise window). In the case where the golden packet is lost, upon receiving the one-byte probing, the receiver side will send out an ACK packet with a SACK segment indicating the receipt of the one byte probe. This provides a good signal to detect the loss of the golden packet and packets transmitted or retransmitted before it.

Because the one-byte probing is used to determine the reordering, it needs to have an order-stamp value assigned to it. So every time a one-byte probing is sent out, cur-order-stamp value is assigned to it and increases by one. When an ACK packet with SACK comes in indicating the receipt of the one-byte probe by the receiver side, the highest-recv-order value is updated to the one-byte probe's order-stamp value if it is smaller than this order-stamp value. If the highest-recv-order value advances because of this, the packets with a smaller order-stamp value will be determined to be lost and are retransmitted.

Figure 5:
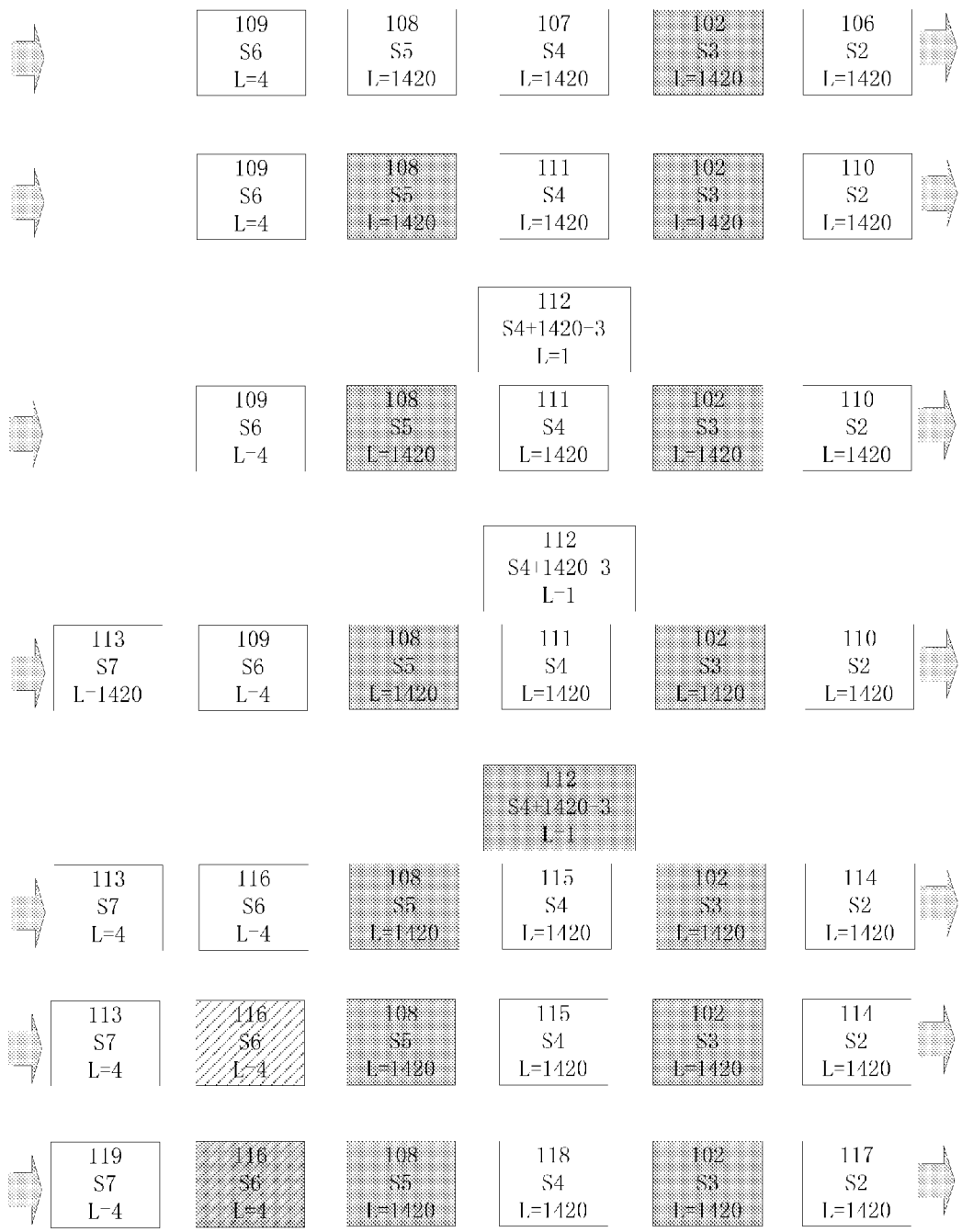
FIG. 5 illustrates packet flow in accordance with another exemplary method of the invention.

FIG. 5 illustrates TCP reorder probing in accordance with the invention. It continues from the TCP transmission of FIG. 3 and each packet's TCP payload length is given as "L=" in the figure. A new packet with starting sequence of S6 and length of 4 bytes is transmitted to the TCP receiver side. It is assigned an order-stamp value of 109. The highest-recv-order value is still 102 (as shown in FIG. 3). Packet S5 is SACKed and the highest-recv-order value increased to 108. With this increase, packets S2 and S4 are determined to be lost. Packets S2 and S4 are retransmitted and assigned with new order-stamp values of 110 and 111 respectively. After the retransmission, no new transmissions have been made for half of the current SRTT. TCP reorder probing is then triggered. According to the golden packet selection criteria, packet S4 is picked as the golden packet. According to the one-byte selection criteria, the third largest sequence of packet S4 (sequence S430 1420–3) is picked as one-byte probing sequence. The one-byte probe is transmitted with an order-stamp value of 112.

A new packet with starting sequence of S7 and a length of 1420 is transmitted. It is assigned an order-stamp value of 113. Soon after packet S7's transmission, the one-byte probe with sequence of (S4+1420–3) is SACKed and the highest-recv-order value increase to 112. With this increase, packets S2, S4, and S6 are determined to be lost. Packets S2, S4 and S6 are retransmitted and assigned with new order-stamp values of 114, 115, and 116 respectively. After the retransmissions, no new transmissions have been made for half of the current SRTT. TCP reorder probing is then triggered. According to the golden packet selection criteria, packet S6 is picked as the golden packet. Because packet S6's size is smaller than the threshold of 8 bytes, it is transmitted as a whole. This retransmission is not triggered by reorder detection so packet S6 has ambiguity and hence no new order-stamp value is assigned to it. After a while, packet S6 is SACKed and the highest-recv-order value increases to 116. With this increase, packets S2, S4, and S7 are determined to be lost. Packets S2, S4 and S7 are retransmitted and assigned with new order-stamp values of 117, 118, and 119 respectively.

The goal of the TCP reorder probing mechanism is to prompt the receiver side into replying with ACK packets that can be mapped back to the triggering probe packet. While a simple and efficient algorithm including a golden packet and isolated byte selections has been described, the method may be implemented using other byte selection criteria. For example instead of using bytes spaced by a single byte (i.e., bytes 1, 3, 5, 7, 9 . . . ), an alternative implementation may choose isolated bytes having other patterns such as 1, 4, 7, 10, 13 . . . , or even the sequence 1, 3, 6, 8, 11 . . . with irregular or random gaps. Furthermore, the selection of the bytes does not have to be isolated. The left edge of the block (refer to RFC2018) in the SACK options that don't line up to the sent non-probing packet boundaries to infer the triggering probe.

The two methods described above can not only expedite retransmission, but also be used in calculating RTT (Round Trip Time, refer to RFC793) and RTO more frequently and more accurately. Because they reduce the ambiguity of the ACK and SACK information, more data packets that are ACKed or SACKed can be used to calculate RTT and RTO. In addition, the TCP one-byte probes may stimulate ACKs with SACK segments that can also be used to calculate RTT and RTO.

For each ACK packet received that acknowledges new data packets, the ACKed packet with the highest order-stamp value that was not SACKed and has no ambiguity (i.e., there was no retransmission or all retransmissions were triggered by reorder detections) among all ACKed packets should be used to adjust RTO. In case there is an ACKed packet that was not SACKed but has ambiguity, the ACK packet cannot be used to calculate the RTO because it becomes hard to determine which packet triggered the ACK packet (the ACK may be triggered by the packet with ambiguity).

For each duplicate ACK packet (do not ACK new data packet) with SACK segments, if the first SACK segment SACKs new data packets (never been SACKed before), the newly SACKed packet with the highest order-stamp value and without ambiguity should be picked to adjust RTO. Similar to the acknowledgment situation, if the first SACK segment SACKs any packet that has ambiguity, the duplicate ACK packet cannot be used to adjust RTO. If the first SACK segment indicates the receipt of a one-byte probing, the one-byte probing packet should be used to adjust RTO if the one-byte sequence has only been used for probing once.

For example, and with reference to FIG. 3, the SACK of packet S3 can be used for RTO update because it does not have ambiguity. The ACK packet of packet S1 can be used for RTO updating also. In FIG. 5, the SACK of packet S3 and S5 can be used for RTO updating. In addition, the one-byte probing with sequence of (S4+1420–3) can be used for RTO updating. But the SACK of packet S6 cannot be used for RTO updating because it has ambiguity (retransmission is not triggered by reorder detection).

Using the methods described above, most of the retransmissions are expected to be triggered by reordering detection and the one-byte probing mechanism, and RTO timeout can be avoided. But some devices in the network path, most notably security devices, may drop the one-byte probing. To ensure continuity, RTO timeout still needs to be handled. Traditional TCP RTO handling resets the TCP congestion window to one or two segments and falls back to a slow start. To avoid this situation, a method in accordance with the invention provides RTO handling that provides for detection of packet loss and avoids unnecessary slow starts.

To achieve this, the method retransmits both the lowest sequence number packets and the latest transmitted or retransmitted packet (referred to as latest-sent-packet hereinafter) upon RTO timeout instead of transmitting the two lowest sequence number packets as in traditional TCP. In this manner, in case the ACK or SACK information from the receiver side is received and indicates the reception of the latest-sent-packet, a clear signal is provided that indicates that the packets sent out before it are lost. With this indication, the lost packets are retransmitted as soon as possible if the congestion window allows.

In accordance with this method, two packets are retransmitted. One is the first non-ACKed packet (with the lowest TCP sequence number among non-ACKed packets). The retransmission is important because any TCP stack will acknowledge a new packet with a higher TCP sequence number upon receiving the packet, and this guarantees that no matter the implementation of the peer TCP stack and how strict the policies are in the security devices along the network path, a new ACK packet should always have a good opportunity to come in if the peer is still alive.

To choose another packet to retransmit, follow these criteria:
1. The packet is within the advertise window;
2. The packet is not SACKed; and
3. The packet has the largest order-stamp value among all the packets meeting criteria 1 and 2.

With this selection of the second packet to transmit, when the peer TCP stack does receive this packet and its ACK packet (likely with SACK information) is received by the TCP sending side, all non-SACKed packets with a smaller order-stamp value can be determined as lost and retransmitted. In case the second selected packet is the first selected packet, its retransmission should be skipped.

With reference to FIG. 5, after the retransmissions of packets S2, S4 and S7, if RTO timeout occurs, packets S2 and S7 (the second selected packet to retransmit) should be retransmitted. In case S7 is SACKed after the retransmission, both packets S2 and S4 can be determined to be lost and retransmitted. For these RTO retransmitted packets, because they are not determined using reordering detection, they should not be assigned with new order-stamp values and cannot be used to update RTO.

The above-described methods rely on SACK options. It has been found that some devices, especially some security devices, may mishandle the SACK information when they are tweaking TCP sequence numbers for some purposes. It has been found that these devices add a constant number to the TCP sequence field in the TCP header, but don't change the SACK segments accordingly. When this happens, the SACK information becomes completely useless. To handle this potential defect in network paths a SACK delta probing method is provided to remedy the corrupted SACK sequence numbers.

The method in accordance with the invention provides:
1. Two variables per TCP connection are maintained. One variable is probe-state with an initial value of PROBE_NONE. Another variable is sack-delta with an initial value of zero;
2. After the TCP three way handshake and the first data packet is transmitted, if the first data packet size is bigger than one and does not have the FIN (refer to RFC793) flag marked in the TCP flags, change the probe-state to PROBE_CAN_START state, otherwise change probe-state to PROBE_END state;
3. When the second data packet is ready to be transmitted, if it has a TCP payload length bigger than one, has no FIN marked in its TCP flags, and the probe-state is in the PROBE_CAN_START state, transmit the byte with the largest TCP sequence of the packet as a separate probing packet, repeating a certain number of times, for example two times (multiple probes are to reduce the risk of probing failure caused by the loss of the probing packets or returned ACKs), and change probe-state to PROBE_START state before transmitting the second data packet as a whole. If any of the conditions are not met, change probe-state to PROBE_END;
4. In further TCP transmissions, if a single byte TCP payload packet is transmitted to the receiver side and the probe-state is still in PROBE_START state, change the probe-state to PROBE_END state. Because after this one byte packet transmission, it becomes hard to determine whether the future one sequence SACK segment is triggered by this one byte TCP payload packet or the one byte SACK delta probing packet;
5. If any ACK or SACK information is received indicating any sequence received by the receiver side that passes the SACK delta probing probe sequence, change the probe-state to PROBE_END state if probe-state is still in PROBE_START state;
6. When an ACK comes in with a SACK segment of one byte and the probe-state is in PROBE_START state, use it to calculate sack-delta, which is equal to the SACKed single sequence number minus the sequence number used for SACK delta probing. After this is done, set probe-state to PROBE_END state;
7. All the sequence numbers in SACK segments are adjusted with sack-delta (minus sack-delta to derive the correct SACK sequence numbers). If the SACK probing is not successful or never started at all, the sack-delta is zero and this adjustment does not change the sequence numbers in SACK segments.

The key of the SACK sequence delta probing is to transmit a probing packet with a unique TCP sequence or sequence range once or several times so that from the returned ACK packet with SACK segments, it can be determined that a SACK segment is triggered by the probing packet without ambiguity.

The methods in accordance with the invention do not introduce any new definition to existing IP and TCP header fields, nor do they require any new IP or TCP options, which make them completely compatible with standard TCP stacks. Further, the methods in accordance with the invention can be implemented either in the TCP stack of a host computer or other network terminals to gain better TCP performance. Finally, the methods in accordance with the invention can be implemented in network devices as a TCP enhancement proxy to increase the throughput.

We claim:
1. A computer-implemented method for detecting TCP packet losses and retransmitting packets comprising:
assigning to each packet transmitted or retransmitted a sequential order number;
determining from an acknowledgment thereof the sequential order number of a received packet;
recording the determined sequential order number as a highest-recv-order number in case the determined sequential order number is greater than a current highest-recv-order number;
assigning to a packet a new sequential order number if it is associated with a sequential order number less than the highest-recv-order number and is not acknowledged; and
retransmitting the packet.

2. The computer-implemented method of claim 1, further comprising transmitting a probe packet in case no packets are transmitted or retransmitted for a pre-determined period of time and there at least one unacknowledged packet.

3. The computer-implemented method of claim 2, further comprising assigning the probe packet a sequential order number, wherein the probe packet having at least one byte from the packet having the highest sequential order number.

4. The computer-implemented method of claim 2, wherein the pre-determined period of time is determined based on a Smoothed Round Trip Time (SRTT).

5. The computer-implemented method of claim 4, wherein the pre-determined period of time is half of SRTT.

6. The computer-implemented method of claim 4, wherein the pre-determined period of time is SRTT.

7. The computer-implemented method of claim 2, further comprising calculating round trip time (RTT) based on an ACK packet or SACK segment received in response to the probe packet.

8. The computer-implemented method of claim 2, further comprising calculating retransmission timeout (RTO) based on an ACK packet or SACK segment received in response to the probe packet.

9. The computer-implemented method of claim 1, further comprising retransmitting the packet with the highest sequential order number in case retransmission timeout (RTO) is triggered.

10. The computer-implemented method of claim 1, wherein the acknowledgment includes an ACK packet or SACK segment.

* * * * *